United States Patent [19]
Robbins

[11] Patent Number: 5,183,444
[45] Date of Patent: Feb. 2, 1993

[54] CONTINUOUSLY VARIABLE TRANSMISSION

[75] Inventor: Francis B. Robbins, Dryden, N.Y.

[73] Assignee: Borg-Warner Automotive Inc., Sterling Heights, Mich.

[21] Appl. No.: 917,513

[22] Filed: Jul. 17, 1992

Related U.S. Application Data

[63] Continuation of Ser. No. 723,249, Jun. 28, 1991, abandoned.

[51] Int. Cl.$^5$ .............................................. F16H 37/08
[52] U.S. Cl. ................................... 475/210; 475/198; 475/213; 475/219
[58] Field of Search ............... 475/198, 207, 210, 213, 475/219; 474/69, 70

[56] References Cited

U.S. PATENT DOCUMENTS

| | | | |
|---|---|---|---|
| 4,342,238 | 8/1982 | Gardner | 475/66 |
| 4,433,594 | 2/1984 | Smirl | 475/206 |
| 4,436,193 | 3/1984 | Smirl | 192/107 |
| 4,458,318 | 7/1984 | Smit et al. | 364/424.1 |
| 4,515,255 | 5/1985 | Haley et al. | 192/3.7 |
| 4,589,303 | 5/1986 | Roberts | 475/211 |
| 4,684,496 | 3/1987 | Petzold | 192/0.076 |
| 4,706,518 | 11/1987 | Moroto et al. | 475/210 |
| 4,718,308 | 1/1988 | Haley | 74/866 |
| 4,784,018 | 11/1988 | Okada et al. | 475/210 X |
| 4,873,879 | 10/1989 | Butterfield et al. | 475/200 |
| 4,947,970 | 8/1990 | Miller | 192/0.076 |
| 5,006,092 | 4/1991 | Neuman et al. | 474/8 |
| 5,007,512 | 4/1991 | Petzold | 192/3.51 |

FOREIGN PATENT DOCUMENTS

| | | | |
|---|---|---|---|
| 59-80553 | 5/1984 | Japan | 475/210 |
| 60-249757 | 12/1985 | Japan | 475/210 |
| 61-65963 | 4/1986 | Japan | 475/210 |

*Primary Examiner*—Leslie A. Braun
*Assistant Examiner*—William O. Trousdell
*Attorney, Agent, or Firm*—Reising, Ethington et al.

[57] ABSTRACT

A continuously variable transmission and differential combination including an input shaft 36, a variable speed drive pulley 40 on the input shaft 36, a drive shaft 54, a variable speed driven pulley 500 on the driven shaft 54 and a v-belt 48 trained around the pulleys 40 and 50. A drive sprocket 64 driven by the drive shaft 54 and a driven sprocket 64 with a silent chain 66 trained around them provides a speed reduction drive. The driven sprocket 68 drives a sun gear 88 which drives planet gears 98 that mesh with a stationary ring gear 100. The planet carrier 102 is rotated at a reduced speed. The bevel gears 108 and 112 carried by the planet carrier 102 form a differential that drives axles 114 and 116. A reversing gear drive can be provided between the sun gear 78 and the sun gear 88 to reverse the direction of rotation of the axles 114 and 116.

11 Claims, 3 Drawing Sheets

CONTINUOUSLY VARIABLE TRANSMISSION

This is a continuation of copending application Ser. No. 07/723,249 filed Jun. 28, 1991, now abandoned

TECHNICAL FIELD

The invention relates to a continuously variable transmission and differential for a vehicle.

BACKGROUND OF THE INVENTION

Continuously variable transmissions and differential combinations for vehicles have been under development for several years. These units have a driven input shaft with a first variable drive pulley, a driven shaft with a second variable drive pulley and a v-belt trained around the two pulleys. The first variable drive pulley on the input shaft has a fixed sheave and an adjustable sheave. The adjustable sheave is moved axially along the input shaft toward or away from the fixed sheave to change the effective diameter of the first variable drive pulley. The second variable drive pulley on the driven shaft includes a fixed sheave and an adjustable sheave that is moved axially along the driven shaft to change the effective diameter of the second variable drive pulley. The adjustable sheave of the second variable drive pulley is spring biased and hydraulically biased toward the fixed sheave so that the second variable drive pulley changes its effective diameter in response to changes in the effective diameter of first variable drive pulley and so that tension on the v-belt is maintained.

The driven shaft drives a reversible gear train. The reversible gear train drives a differential through a speed reduction system. The speed reduction system can be reduction gears or a chain trained around a drive sprocket and a driven sprocket. The differential drives the axle shafts that the wheels are mounted on.

The transmission input shaft is driven by a power source at substantially higher speed than the speed at which the axle shafts turn. The v-belt and the first and second variable drive pulleys drive the output shaft at speeds that are slower than, equal to or higher than the input shaft speed. Due to the fact that the driven shaft may be driven faster than the input shaft substantial speed reduction is required between the driven shaft with the second variable drive pulley and the axle shafts.

The speed reduction systems used in the past have required substantial space which is not available in many vehicle applications. The single stage speed reduction also reduces the ability to change the fixed ratios.

SUMMARY OF THE INVENTION

An object of the invention is to provide an efficient and compact vehicle drive train.

Another object of the invention is to provide a vehicle drive train with a variable speed belt drive, a speed reduction and a reversing drive system, and a differential driven by planetary reduction gears.

The continuously variable transmission (C.V.T) includes a variable speed belt drive. The input shaft for the variable speed belt drive is driven by an engine through a torque converter. The C.V.T. output shaft drives a first speed reducer which drives a planetary reduction drive. The planetary reduction drives a differential and drive axles.

The planetary reduction drive includes an input drive sun gear which drives planet gears. The planet gears mesh with a fixed ring gear. The differential bevel gear carrier is also the planet gear carrier and is driven by the planet gears at a reduced speed.

A reverse gear drive may be provided between the first speed reducer and the planetary reduction drive or between the variable speed belt drive and the planetary reduction drive.

The use of a planetary reduction drive connected directly to the differential permits the first speed reducer and the reverse gear drive to run at higher speed and transmit less torque. The reduced torque allows the use of smaller components in the first speed reducer and the reverse gear drive. The size of the transmission package can be reduced due to the employment of smaller components in the first speed reducer and the reverse gear drive.

The planetary reduction drive associated with the differential can be easily modified to change the speed reduction ratio. By changing the speed reduction ratio the transmission can accommodate different tire sizes and different vehicle requirements.

The foregoing and other objects, features and advantages of the present invention will become apparent in light of the following detailed description of an exemplary embodiment thereof, as illustrated in the accompanying drawing.

Figure 1:
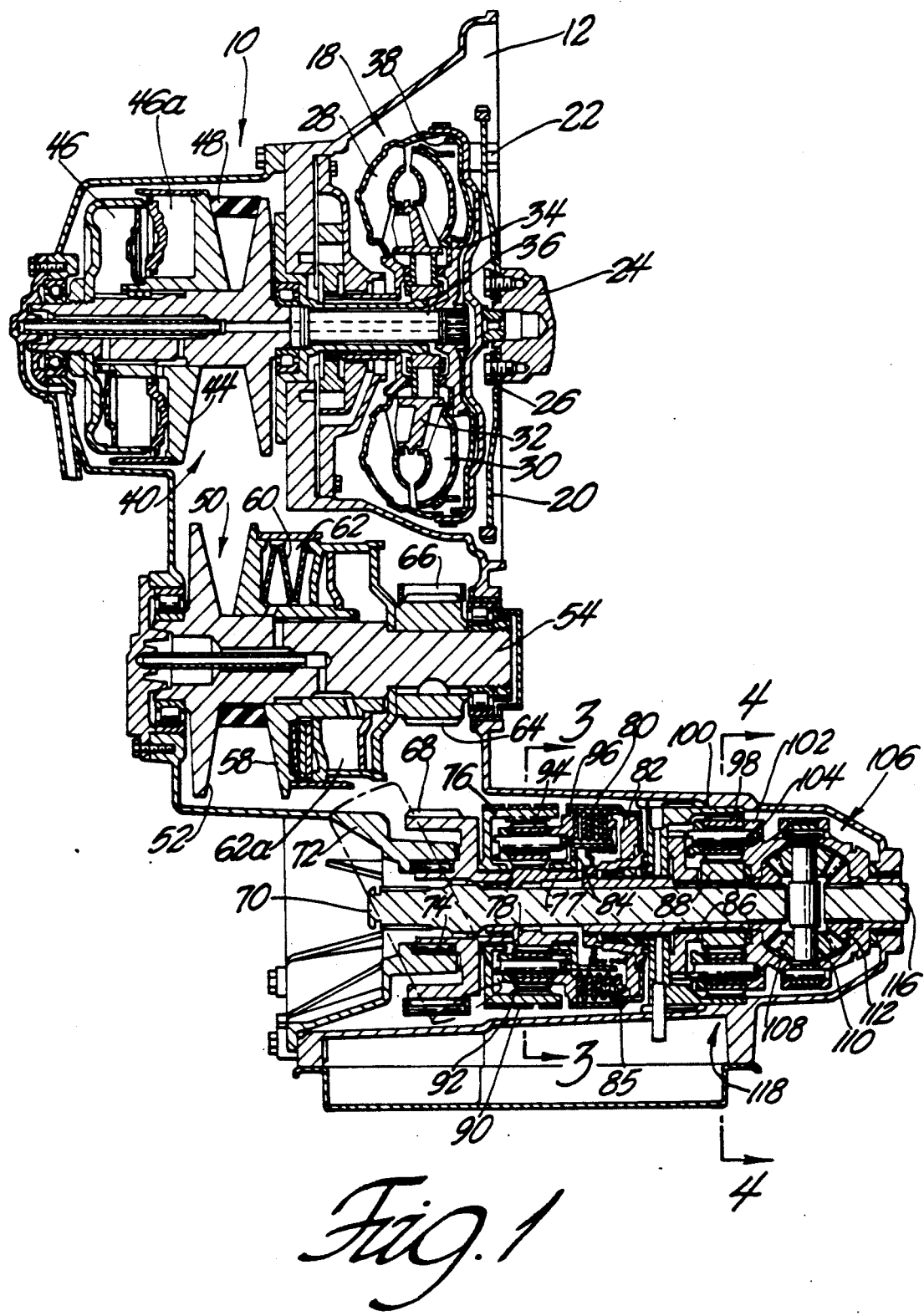
FIG. 1 is a sectional view of a continuously variable transmission and axle drive, taken through the drive shafts.

The continuously variable transmission (C.V.T.) 10 and axle drive has a bell housing 12 adapted to be bolted to an internal combustion engine by hollow dowels 14 and bolts that pass through holes 16. A torque converter 18, as shown in FIG. 1, is bolted to a drive plate 20 by bolts 22. The drive plate 20 is bolted to an engine crankshaft 24, a portion of which is shown, by bolts 26. The impeller 28, which is rotated by the engine crankshaft 24 causes fluid to flow. The fluid contacts the turbine wheel 30 and causes it to rotate. The reactor 32 directs the flow of fluid. The turbine wheel 30 is attached to a hub member 34 which is splined to and drives the C.V.T input shaft 36. A lockup clutch 38 locks the torque converter 18 under some operating conditions.

The C.V.T. input shaft 36 drives a variable speed v-belt drive pulley 40. The variable speed drive pulley 40 includes a fixed sheave 42 that is an integral part of the input shaft 36 and an adjustable sheave 44 that is axially moveable on the input shaft. The adjustable sheave 44 is moved axially on the input shaft 36 to change the effective diameter of the variable speed drive pulley 40. Oil, under pressure, is directed into or out of the chambers 46 and 46a by a control system, which is not shown, to move the adjustable sheave 44.

A v-belt 48 is trained around the variable speed drive pulley 40 and a variable speed driven pulley 50. A sheave 52 of the variable speed driven pulley 50 is an integral part of the drive shaft 54. The drive shaft 54 and the sheave 52 both rotate about an axis 56. The driven pulley 50 includes an adjustable sheave 58 that is axially moveable on the drive shaft 54 and is biased toward the integral sheave 52. The bias is provided by a hydraulic control system which meters oil under pressure into and out of chambers 62 and 62a. Belleville washers or springs 60 provide tension on the v-belt during start up when hydraulic pressure is low. When the adjustable sheave 44 is moved axially by oil, under pressure, that is directed to or from the chamber 46 and 46a, the belleville springs 60 will expand or compress and the adjustable sheave 58 will move axially to maintain proper tension on the v-belt 48.

Figure 2:
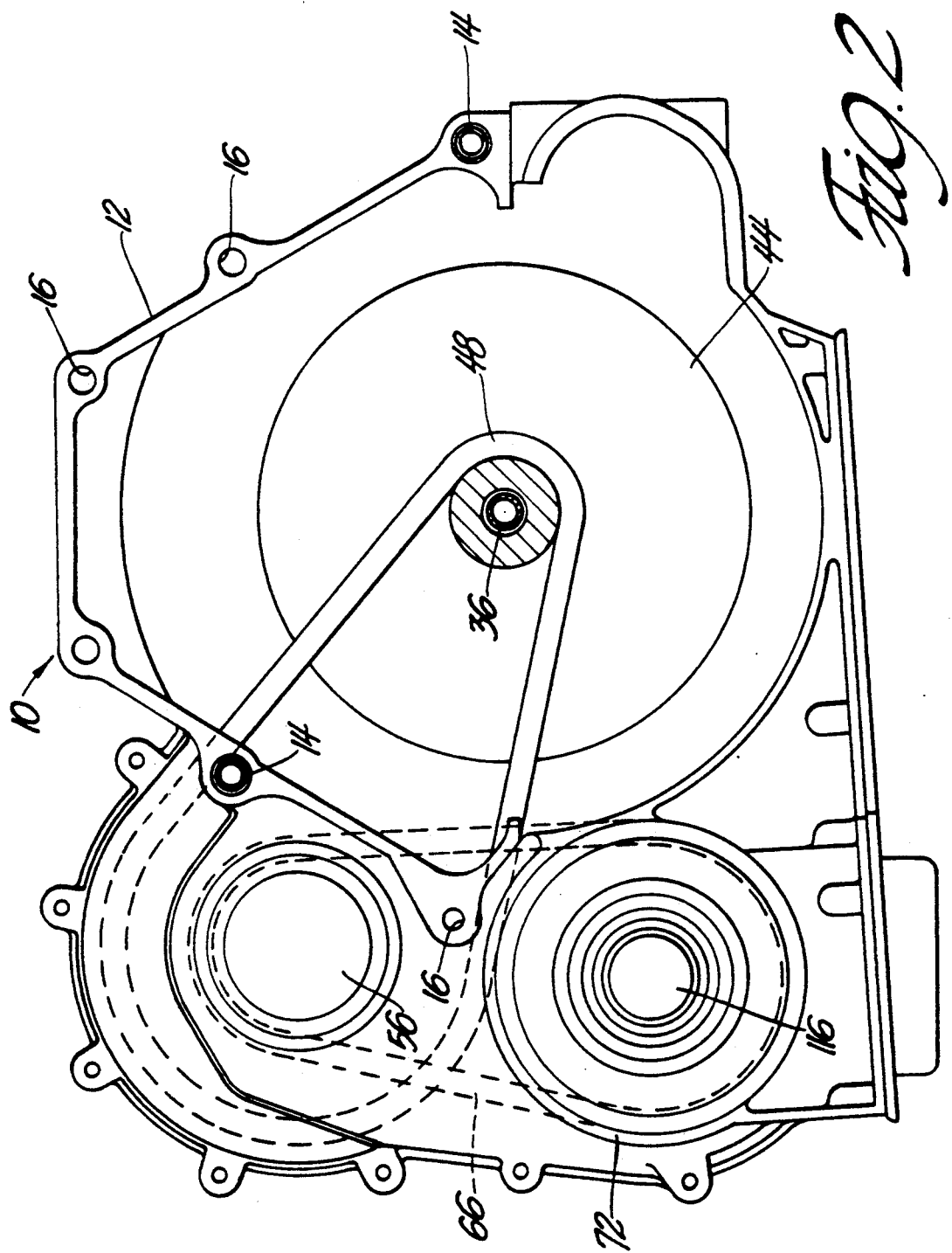
FIG. 2 is a side elevation showing the relative location of the shafts and the belt and chain drives.

The v-belt 48 can change from a low speed position, as shown in FIG. 2, to a high speed position when the chambers 46 and 46a are filled with oil, the adjustable sheave 44 is moved close to the fixed sheave 42 and the v-belt moves out to the outer edge of the variable speed drive pulley 40. When the v-belt 48 moves to the outer edge of the variable speed drive pulley 40, it also moves toward the center of the driven pulley 50. With the v-belt 48 in the position shown in FIG. 2, the drive shaft 54 will rotate at a slower speed than the input shaft 36. Moving the adjustable sheave 44 on the input shaft 36 toward the fixed sheave 42 will increase the speed of the drive shaft 54. When the adjustable sheave 44 is at its closest position to the fixed sheave 42, the drive shaft 54 will run faster than the input shaft 36. Some place in the middle of the travel range of the adjustable sheave 44, the drive shaft 54 will rotate at the same speed as the input shaft 36.

Oil under pressure can be directed into or out of the chambers 62 and 62a to move the adjustable sheave 58 toward or away from the fixed integral sheave 52. The adjustable sheave 58 is moved to control tension on the v-belt 48.

The drive shaft 54 rotates the drive sprocket 64. The drive sprocket 64 drives a silent chain 66 which is trained around the drive sprocket 64 and a driven sprocket 68 that is rotatable about the axis of axle 70. The drive sprocket 64 is smaller than the driven sprocket 68 to reduce the speed of the driven sprocket 68.

The driven sprocket 68 is rotatably supported on the housing 72 by a roller bearing 74. A ring gear 76 is rotatably journaled on the driven sprocket 68. The drive sprocket 68 is also connected to sleeve 77 by a spline. The sun gear 78 can be an integral part of the sleeve 77 or can be connected by a spline. When the forward clutch 80 is locked up by piston 82, torque is transmitted from the sun gear 78 to a clutch driving member 84, to the clutch outer housing 85 to the sleeve 86 and to the sun gear 88 splined to the sleeve 86.

Figure 3:
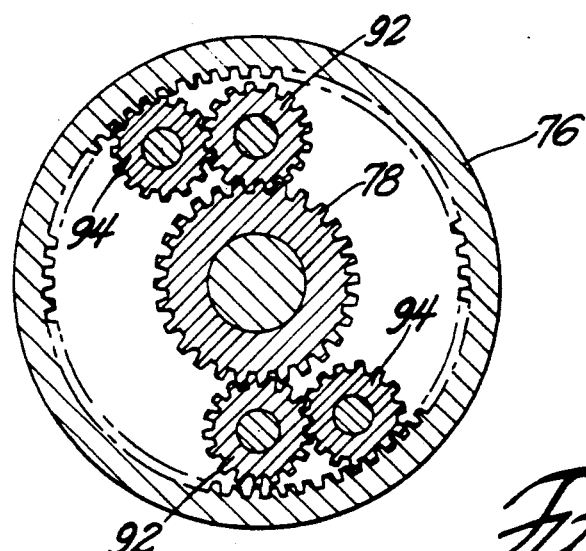
FIG. 3 is a sectional view of the reverse drive planetary along line 3—3 in FIG. 1.

To reverse the drive, the forward clutch 80 is released and the brake band 90 is applied or tightened to hold the ring gear 76. The sun gear 78, as shown in FIG. 3, will rotate the inner planet gears 92. The inner planet gears 92 rotate the outer planet gears 94 which react with the ring gear 76 to rotate the planet carrier 96 in the opposite direction to the direction of rotation of the sun gear 78. The planet carrier 96 is connected to the clutch outer housing 85, to the sleeve 86 and to the sun gear 88.

The forward reverse drive could, if desired, be moved in the drive train. It could, for example, be associated with the drive shaft 54. If associated with the drive shaft 54, it would be just after the variable speed drive. Such a location would change the size and shape of the total transmission package. Such a change in size and shape may have an advantage in some vehicles.

The sun gear 88 is a portion of the simple fixed ratio planetary reduction gear drive 118. The sun gear 88 drives planet gears 98. The planet gears 98 mesh with a fixed ring gear 100. The planet carrier 102 carries the pins 104 the planet gears 98 are journaled on. The planet carrier also supports and houses the differential 106. The differential 106 includes bevel gears 108 that are rotatably journaled on a shaft 110 supported in the planet carrier 102. Bevel gears 112, which are journaled in the planet carrier 102 and mesh with at least two of the bevel gears 108 are also part of the differential. The two beveled gears 112 journaled in the planet carrier 102 have splined bores which received splined ends of axles 70 and 116. The axles 70 and 116 are connected to axle extensions or shafts through constant velocity joints to wheels which drive and steer a vehicle.

The double planet reverse drive is shown in FIG. 3 as including one sun gear 78, two inner planet gears 92 that mesh with the sun gear 78 and two outer planet gears 94, which each mesh with an inner planet gear 92 and the ring gear 76. The preferred form for the double planet reverse drive includes four inner planet gears 92 in mesh with the sun gear 78 and four outer planet gears 94 each of which is in mesh with the ring gear 76 and an inner planet gear 92.

Figure 4:
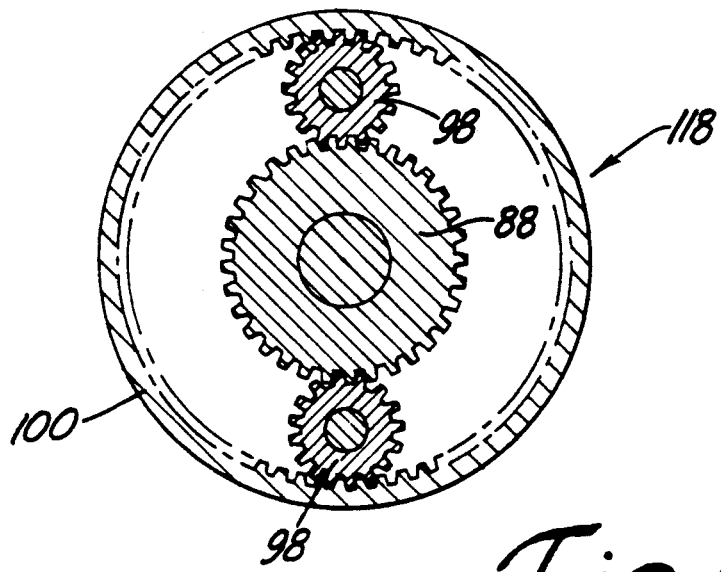
FIG. 4 is a sectional view of the final drive reduction planetary taken along the line 4—4 in FIG. 1.

The simple fixed ratio planetary reduction gear drive 118 is shown in FIG. 4 with two planet gears 98 for simplification. The drive could be used with two planet gears 98. However, the preferred form of the simple fixed ratio planetary reduction gear drive 118 employees four sun gears 98.

The differential 106, as shown in FIG. 1, has two bevel gears 108 rotatably journaled on a shaft 110. Differentials with two bevel gears that mesh with bevel gears 112 with spines that receive the axles 70 and 116 are common. It is, however, also common to use four bevel gears 108, if desired.

The first speed reducer, with drive sprocket 64 and driven sprocket 68, and a silent chain 66 trained around the sprockets could be replaced by meshing gears, if desired.

The simple fixed ratio planetary reduction gear drive 118, that is a portion of the differential 106 provides a number of advantages. It reduces the load on all gear train parts between the crankshaft 24 and the sun gear 88. As a result of the reduced load, the size and weight of all components can be reduced. The drive ratios provided by the transmission can be changed to meet vehicle requirements by changing the sprockets 64 and 68 and by changing the gear ratios in the planetary reduction gear drive 118. The ability to make drive ratio modifications in two places increases the versatility. There is a limit to the size sprocket 68 that will fit in the transmission housing. The drive ratios may be changed for different size tires, for different types of vehicles and for different vehicle uses. Vehicle trailer towing packages, for example, commonly include changes in the drive ratio.

Preferred embodiments of the invention have been described in detail, but they are examples only and the invention is not restricted thereto. It will be easily understood by those skilled in the art that modifications and variations can easily be made within the scope of the invention.

I claim:

1. A continuously variable transmission having, in combination, a first variable drive pulley, a second variable drive pulley, a v-belt trained around the first and second variable drive pulleys, a speed reduction drive, driven by the second variable drive pulley, a reversible gear drive driven by the speed reduction drive, a fixed ratio planetary reduction drive driven by the reversible gear drive in one direction or another, a differential driven by the fixed ratio planetary reduction drive and axle shafts driven by the differential.

2. The continuously variable transmission of claim 1, wherein the differential includes a bevel gear carrier and the bevel gear carrier is also a planet carrier for the fixed ratio planetary drive.

3. The continuously variable transmission of claim 1, wherein the speed reduction drive includes a drive sprocket driven by the second variable drive pulley, a driven sprocket and a silent chain trained around the drive sprocket and the driven sprocket.

4. The continuously variable transmission of claim 1, wherein the reversible gear drive includes a sun gear driven by the speed reduction drive, a first planet gear in mesh with the sun gear, a second planet gear in mesh with the first planet gear and a ring gear in mesh with the second planet gear.

5. The continuously variable transmission of claim 1 including a torque converter, adapted to be driven by an internal combustion engine, which drives the first variable drive pulley.

6. A continuously variable transmission having in combination an input shaft, a first variable drive pulley with a fixed sheave on the input shaft and an adjustable sheave moveable axially along the input shaft toward and away from the fixed sheave, a second variable drive pulley with a fixed sheave on a drive shaft and an adjustable sheave moveable axially along the drive shaft toward and away from the fixed sheave of the second variable drive pulley, a v-belt trained around the first and second variable drive pulleys, a speed reduction drive driven by the second variable drive pulley, a reversible gear drive driven by the speed reduction drive, a fixed ratio planetary reduction drive, including a sun gear driven in one direction or the other by the reversible gear drive, a planet gear mounted on a planet carrier and in mesh with the sun gear, a fixed ring gear in mesh with the planet gear on the planet carrier, a differential with bevel gears journaled on the planet carrier and two axles driven by the bevel gears in the differential.

7. The continuously variable transmission of claim 6, wherein the speed reduction drive includes a drive sprocket driven by the drive shaft the second variable drive pulley is mounted on, a driven sprocket that drives the reversible gear drive and a silent chain trained around the drive sprocket and the driven sprocket.

8. The continuously variable transmission of claim 6 including a torque converter, adapted to be driven by an internal combustion engine, which drives the first variable drive pulley.

9. A continuously variable transmission, as set forth in claim 6, wherein the reversible gear drive is a reversible planetary gear drive with a hollow reverse sun gear that is rotatable about a reverse sun gear axis, the sun gear in the fixed ratio planetary reduction drive has a central aperture and is rotatable abut the reverse sun gear axis and wherein one of the axles driven by the bevel gears in the differential passes through the central aperture in the sun gear in the fixed ratio planetary reduction drive and through the hollow reverse sun gear.

10. A continuously variable transmission having in combination a torque converter adapted to be driven by an internal combustion engine; an input shaft driven by the torque converter and rotatable about a first axis; a first variable drive pulley with a fixed sheave on the input shaft and an adjustable sheave moveable axially along the input shaft toward and away from the fixed sheave, a second variable drive pulley with a fixed sheave on a drive shaft rotatable abut a second axis and an adjustable sheave moveable axially along the drive shaft toward and away from the fixed sheave of the second variable drive pulley, and a v-belt trained around the first and second variable drive pulleys; a speed reduction drive including a drive sprocket driven by the drive shaft and rotatable about the second axis, a driven sprocket rotatable about a third axis and a chain trained around the drive sprocket and the driven sprocket; a reversible planetary gear drive with a hollow reverse sun gear that is rotatable about the third axis and is driven by the driven sprocket of the speed reduction drive, a fixed ratio planetary reduction drive including a sun gear with a central aperture driven in one direction or the other by the reversible planetary gear drive and rotatable about the third axis, a planet gear mounted on a planet carrier and in mesh with the planetary reduction drive sun gear, a fixed ring gear in mesh with the planet gear in mesh with the planetary reduction drive sun gear; a differential with bevel gears journaled on the planet carrier; and two axles driven by the bevel gears in the differential and wherein one of the axles passes through the central aperture in the fixed ratio planetary reduction drive sun gear, and through the hollow reversible sun gear.

11. A continuously variable transmission, as set forth in claim 10 wherein the reversible planetary gear drive with a hollow reverse sun gear includes a first planet gear in mesh with the hollow reverse sun gear, a second planet gear in mesh with the first planet gear and a ring gear in mesh with the second planet gear.

* * * * *